United States Patent
Devarajan et al.

(10) Patent No.: US 9,704,097 B2
(45) Date of Patent: Jul. 11, 2017

(54) AUTOMATICALLY CONSTRUCTING TRAINING SETS FOR ELECTRONIC SENTIMENT ANALYSIS

(71) Applicants: SAS Institute Inc., Cary, NC (US); North Carolina State University, Raleigh, NC (US)

(72) Inventors: Ravinder Devarajan, Cary, NC (US); Jordan Riley Benson, Ellerbe, NC (US); David James Caira, Chapel Hill, NC (US); Saratendu Sethi, Raleigh, NC (US); James Allen Cox, Cary, NC (US); Christopher G. Healey, Cary, NC (US); Gowtham Dinakaran, Raleigh, NC (US); Kalpesh Padia, Raleigh, NC (US)

(73) Assignees: SAS INSTITUTE INC., Cary, NC (US); NORTH CAROLINA STATE UNIVERSITY, Raleigh, NC (US)

( * ) Notice: Subject to any disclaimer, the term of this patent is extended or adjusted under 35 U.S.C. 154(b) by 0 days.

(21) Appl. No.: 14/966,117

(22) Filed: Dec. 11, 2015

(65) Prior Publication Data
US 2016/0350651 A1    Dec. 1, 2016

Related U.S. Application Data

(60) Provisional application No. 62/190,723, filed on Jul. 9, 2015.

(30) Foreign Application Priority Data

May 29, 2015 (IN) .......................... 1551/DEL/2015

(51) Int. Cl.
  *G06N 3/08*    (2006.01)
  *G06F 17/27*   (2006.01)
  (Continued)

(52) U.S. Cl.
  CPC ............... *G06N 5/02* (2013.01); *G06F 17/27* (2013.01); *G06N 3/08* (2013.01); *G06N 3/084* (2013.01); *G06N 99/005* (2013.01)

(58) Field of Classification Search
  None
  See application file for complete search history.

(56) References Cited

U.S. PATENT DOCUMENTS

| 5,680,627 A | 10/1997 | Anglea et al. |
| 5,727,081 A | 3/1998 | Burges et al. |

(Continued)

FOREIGN PATENT DOCUMENTS

EP    622752    11/1994

OTHER PUBLICATIONS

Glorot, X. et al., "Domain adaptation for large-scale sentiment classification: a deep learning approach," Proc. fo the 28th Intl. Conf. on Machine Learning (2011) pp. 513-520.*

(Continued)

*Primary Examiner* — Kakali Chaki
*Assistant Examiner* — Brian M Smith
(74) *Attorney, Agent, or Firm* — Kilpatrick Townsend & Stockton LLP

(57) ABSTRACT

Training data for training a neural network usable for electronic sentiment analysis can be automatically constructed. For example, an electronic communication usable for training the neural network and including multiple characters can be received. A sentiment dictionary including multiple expressions mapped to multiple sentiment values representing different sentiments can be received. Each expression in the sentiment dictionary can be mapped to a corresponding sentiment value. An overall sentiment for the electronic communication can be determined using the sentiment dictionary. Training data usable for training the neural (Continued)

network can be automatically constructed based on the overall sentiment of the electronic communication. The neural network can be trained using the training data. A second electronic communication including an unknown sentiment can be received. At least one sentiment associated with the second electronic communication can be determined using the neural network.

30 Claims, 11 Drawing Sheets

(51) Int. Cl.
*G06N 5/02* (2006.01)
*G06N 99/00* (2010.01)

(56) References Cited

U.S. PATENT DOCUMENTS

| | | | |
|---|---|---|---|
| 5,845,285 | A | 12/1998 | Klein |
| 6,728,695 | B1 | 4/2004 | Pathria et al. |
| 7,788,087 | B2 | 8/2010 | Corston-Oliver et al. |
| 8,756,183 | B1 | 6/2014 | Daily et al. |
| 8,775,341 | B1 | 7/2014 | Commons |
| 9,280,747 | B1 | 3/2016 | Jin et al. |
| 9,552,547 | B2 | 1/2017 | Leeman-Munk et al. |
| 9,595,002 | B2 | 3/2017 | Leeman-Munk et al. |
| 2005/0026198 | A1 | 2/2005 | Balac Sipes et al. |
| 2005/0226512 | A1 | 10/2005 | Napper |
| 2010/0054539 | A1 | 3/2010 | Challa et al. |
| 2010/0234246 | A1 | 9/2010 | Jung et al. |
| 2011/0208522 | A1 | 8/2011 | Pereg et al. |
| 2012/0262461 | A1 | 10/2012 | Fisher et al. |
| 2012/0296913 | A1 | 11/2012 | Ash et al. |
| 2013/0212707 | A1 | 8/2013 | Donahue et al. |
| 2014/0188459 | A1* | 7/2014 | Fink .................... G06F 17/2785 704/9 |
| 2014/0229158 | A1 | 8/2014 | Zweig et al. |
| 2015/0312333 | A1 | 10/2015 | Motarwar et al. |
| 2015/0339570 | A1 | 11/2015 | Scheffler |
| 2016/0027437 | A1 | 1/2016 | Hong |
| 2016/0098386 | A1 | 4/2016 | Rangarajan |
| 2016/0117441 | A1 | 4/2016 | Bremel |
| 2016/0247061 | A1 | 8/2016 | Trask et al. |
| 2016/0350644 | A1 | 12/2016 | Devarajan et al. |
| 2016/0350646 | A1 | 12/2016 | Leeman-Munk et al. |
| 2016/0350650 | A1 | 12/2016 | Leeman-Munk et al. |
| 2016/0350652 | A1 | 12/2016 | Min et al. |
| 2016/0350664 | A1 | 12/2016 | Devarajan et al. |

OTHER PUBLICATIONS

Ramaswamy, S. "Visualization of the Sentiment of Tweets," Master's Thesis, North Carolina State University (2011) 69 pp.*
Zhang, C. et al., "Sentiment analysis of Chinese documents: From sentence to document level," Journal of the American Society for Inform. Sci. and Tech. 60.12 (2009) pp. 2474-2487.*
http://math.stackexchange.com/questions/654138/weighted-mean-from-a-set-of-average-and-standard-deviation-pairs Webpost from user Clay on Jan. 28, 2014.*
Moraes, R. et al., "Document-level sentiment classification: An empircal comparison between SVM and ANN," Expert Systems with Applications, 40(2) (2013) pp. 621-633.*
Zhang, L. et al., "Combining Lexicon-based and Learning-based Methods for Twitter Sentiment Analysis" Hewlett-Packard Technical Report HPL-2011-89 (2011) 8 pp.*
Gokcay, D. et al., "Predicting the sentiment in sentences based on words: An exploratory study on ANEW and ANET," 2012 IEEE Intl. Conf. on Cognitive Infocommunications (2012) pp. 715-718.*
Poria, S. et al., "Sentic patterns: Dependency-based rules for concept-level sentiment analysis," Knowledge-Based Systems, vol. 69 (2014) pp. 45-63.*

Nielsen, Finn Arup "A new ANEW: Evaluation of a word list for sentiment analysis in microblogs" DTU Informatics, Technical University of Denmark, Lyngby, Denmark (Mar. 15, 2011) 6 pages.
Gamon, Michael "Sentiment classification on customer feedback data: noisy data, large feature vectors, and the role of linguistic analysis" Microsoft Research (2004) 7 pages.
Stanford University "Sentiment Analysis Recursive Deep Models for Semantic Compositionality Over a Sentiment Treebank" retrieved from http://nlp.stanford.edu/sentiment/ (Nov. 19, 2015) 2 pages.
Stanford Engineering "Stanford algorithm analyzes sentence sentiment, advances machine learning" retrieved from http://engineering.stanford.edu/news/stanford-algorithm-analyzes-sentence-sentiment-adv. (Nov. 19, 2015) 3 pages.
Clarabridge Dictionary "Sentiment Analysis" retrieved from http://www.clarabridge.com/sentiment-analysis/ (Nov. 19, 2015) 6.
Expert System "Semantic Intelligence" retrieved from http://www.expertsystem.com/ 11/ (Nov. 19, 2015) 2 pages.
IBM SPSS Modeler Text Analytics 15 User's Guide (2012) 379 pages.
Natural Language Toolkit "NLTK 3.0 documentation" retrieved from http://www.nltk.org/ (Nov. 19, 2015) 2 pages.
RapidMiner "Effortless predictive analytics. No programming required" retrieved from https://rapidminer.com/products/studio/ 11/ (Nov. 19, 2015) 3 pages.
Lexalytics "Sentiment Extraction Measuring the Emotional Tone of Content" White Paper (Oct. 2015) 8 pages.
Lexalytics "Semantria API Lexalytics Text and Sentiment Analysis, in the cloud" retrieved from https://www.lexalytics.com/semantria (Nov. 19, 2015) 3 pages.
Strapparava et al., "Learning to Identify Emotions in Text" ACM 978-1-59593-753-7/08/0003, SAC'08, Fortaleza, Cear'a, Brazil (Mar. 16-20, 2008) 5 pages.
SAS Institute Inc. "Getting Started with SAS® Text Miner 13.2 SAS" (2014) 116 pages.
SAS Institute Inc. "SAS® Text Miner Automate discovery and insights from document collections" Fact Sheet, (2013) 4 pages.
SAS Institute Inc. "SAS® Visual Analytics 7.3 Getting Started with Data on WindowsSAS®" (2015) 46 pages.
SAS Institute Inc. "SAS® Sentiment Analysis" Fact Sheet, (2013) 4 pages.
SAS Institute Inc. "SAS® Visual Analytics" Fact Sheet, (2015) 8 pages.
SAS Institute Inc. "SAS Visual Analytics" retrieved from http://www.sas.com/en_us/software/analytics/sentiment-analysis.html (Jan. 14, 2016) 4 pages.
SAS Institute Inc. "SAS Sentiment Analysis" retrieved from http://www.sas.com/en_us/software/business-intelligence/visual-analytics.html (Jan. 14, 2016) 3 pages.
Healy et al., "Visualizing Twitter Sentiment" retrieved from http://www.csc.ncsu.edu/faculty/healey/tweet_viz/ (Jan. 14, 2016) 8 pages.
Graves et al., "Bidirectional LSTM Networks for Improved Phoneme Classification and Recognition" ICANN 2005 Artificial Neural Networks: Formal Models and Their Applications—ICANN 2005 pp. 799-804.
Notice of Allowance of Jan. 3, 2017 for U.S. Appl. No. 15/175,503; 10 pages.
Gokcay et al., "Predicting the sentiment in sentences based on wordss: An Exploratory Study on ANEW and ANET" CogInfoCom 2012, 3rd IEEE International Conference on Cognitive Infocommunications, Dec. 2-5, 2012, Kosice Slovakia, 4 pages.
Poria et al., "Sentic Patterns: Dependency-Based Rules for Concept-Level Sentiment Analysis" Science Direct Knowledge-Based Systems www.sciencedirect.com (2014) pp. 1-32.
Chrupala , "Normalizing tweets with edit scripts and recurrent neural embeddings", Proceedings of the 52nd Annual Meeting of the Association for Computational Linguistics, (Jun. 23-25, 2014), pp. 680-686.
Collobert et al., "A Unified Architecture for Natural Language Processing: Deep Neural Networks with Multitask Learning", Proceedings of the 25th International Conference on Machine Learning, (2008), pp. 160-167.

(56) References Cited

OTHER PUBLICATIONS

Dahl et al., "Context-Dependent Pre-Trained Deep Neural Networks for Large-Vocabulary Speech Recognition", IEEE Transactions on Audio, Speech, and Language Processing, vol. 20, No. 1., (Jan. 2012), pp. 30-42.

Ghiassi et al., "Twitter brand sentiment analysis: A hybrid system using n-gram analysis and dynamic artificial neural network", Expert Systems with Applications, vol. 40, Issue 16., (Nov. 15, 2013), pp. 6266-6282.

Gupta et al., "Spell Checking Techniques in NLP: A Survey", International Journal of Advanced Research in Computer Science and Software Engineering. vol. 2, Issue 12., (Dec. 2012), pp. 217-221.

Hodge et al., "A comparison of a novel neural spell checker and standard spell checking algorithms", Pattern Recognition. vol. 35, Issue 11, (Nov. 2002), pp. 2571-2580.

Hodge et al., "A Comparison of Standard Spell Checking Algorithms and a Novel Binary Neural Approach", IEEE Transactions on Knowledge and Data Engineering, vol. 15, No. 5., (Sep./Oct. 2003), pp. 1073-1081.

Kukich et al., "Techniques for Automatically Correcting Words in Text", ACM Computing Surveys, vol. 24 Issue 4, (Dec. 1992), pp. 377-439.

Lewellen, "Neural Network Recognition of Spelling Errors", Annual Meeting of the Association of Computational Linguistics, (1998), pp. 1490-1492.

Li, "Neural Network Approaches for Noisy Language Modeling", IEEE Transactions on Neural Networks and Learning Systems, vol. 24, No. 11, (Nov. 2013), pp. 1773-1784.

Su et al., "Error Back Propagation for Sequence Training of Context-Dependent Deep Networks for Conversational Speech Transcription", ICASSP, (2013), pp. 6664-6668.

Healey, C. https://www.csc.ncsu.edu/faculty/healey/tweet_viz/tweet_app/ Faculty webpage, verified by the Internet Archive: Wayback Machine to have existed since at least before (2013) 5 pages.

Dos Santos, C. et al., "Deep convolutional neural networks for sentiment analysis of short texts," Inti. Conf. on Computational Linguistics (COLING 2014) pp. 69-78.

Kohli, A. http://amitkohli.com/sentiment-analysis-on-my-girlfriends-text-messages/ blog post on (Sep. 11, 2015) 9 pages.

Ramaswamy, S. "Visualization of the Sentiment of Tweets," Master's Thesis, North Carolina State University (2011) 69 pages.

Conway, "Chat Room Sentiment Analysis with Stanford CoreNLP and ELK" (2016) 8 pages.

Lewis, G., "Sentence Correction Using Recurrent Neural Networks" Department of Computer Science, Stanford University (2016) 7 pages.

Sakaguchi et al., "Robust Wrod Recginition via semi-Character Recurrent Neural Networks" Center for Language and Speech Processing, Johns Hopkins University (2016) 5 pages.

Jockers, M., blog posts from www.matthewjockers.net from dates between Jun. 5, 2014 and Mar. 24, 2015 61 pages.

Wang, X. et al., "Topic sentiment analysis in Twitter: a graph-based hashtag sentiment classification approach," Proc. of the 20th ACM Intl. Conf. on Information and Knowledge Management (2011) pp. 1031-1040.

Henning, L. et al., "An ontology-based approach to text summarization" IEEE/WIC/ACM Inti. Conf. on Web Intelligence and Intelligent Agent Technology (2008) 4 pages.

Response by user ttnphns to post "Euclidean distance score and similarity" at http://stats.stackexchange.com/questions/53068/euclidean-distance-score-and-similarity dated (Mar. 23, 2013) 1 page.

Suominen, H. et al., "Twitter for health—building a social media search engine to better understand and curate laypersons' personal experiences" in Amy Neustein (ed.), Text Mining of Web-based Medical Content, De Gruyter, Berlin (2014) pp. 133-174.

Saif, H. et al, "Semantic patterns for sentiment analysis of Twitter" International Semantic Web Conference, Springer International Publishing (Oct. 2014) pp. 324-340.

Xiang, B. et al., "Improving Twitter sentiment analysis with topic-based mixture modeling and semi-supervised training" Proceedings of 52nd Annual Meeting of the Association for Computer Linguistics (Jun. 23-25, 2014) pp. 434-439.

An Introduction to R—Oct. 4, 2004—https://web.archive.org/web/20041023014142/http://cran.r-project.org/doc/manuals/R-intro.html (2016) 83 pages.

Zhang et al. "A Phrase-based Statistical Model for SMS Text Normalization" Proceedings of the COLING/ACL 2006 Main Conference Poster Sessions (Jul. 2006) pp. 33-40.

Non-Final Office Action of Mar. 11, 2016 for U.S. Appl. No. 14/937,810, 14 pages.

Non-Final Office Action of May 5, 2016 for U.S. Appl. No. 14/967,619, 49 pages.

Non-Final Office Action of Jul. 1, 2016 for U.S. Appl. No. 14/966,380, 16 pages.

Final Office Action of Sep. 19, 2016 for U.S. Appl. No. 14/937,810, 9 pages.

Notice of Allowance of Oct. 7, 2016 for U.S. Appl. No. 14/937,810, 5 pages.

Final Office Action of Nov. 30, 2016 for U.S. Appl. No. 14/967,619, 22 pages.

Non-Final Office Action of Dec. 16, 2016 for U.S. Appl. No. 15/177,237, 26 pages.

Non-Final Office Action of Dec. 19, 2016 for U.S. Appl. No. 14/966,380, 15 pages.

Advisory Action of Mar. 3, 2017 for U.S. Appl. No. 14/967,619, 5 pages.

Non-Final Office Action of Mar. 31, 2017 for U.S. Appl. No. 14/967,619, 23 pages.

Final Office Action of Mar. 29, 2016 for U.S. Appl. No. 14/966,380, 17 pages.

\* cited by examiner

| Block of Characters | Sentiment |
|---|---|
| How can I help you today? | Positive |
| Our program won't start up properly. | Neutral |
| By the way, I'm not happy about this. | Negative |
| I appreciate that! | Positive |
| My boss would have killed me if he came in and found out we couldn't get data analyzed because of this. | Positive |
| Thanks, this was all I needed. | Positive |

FIG. 7

AUTOMATICALLY CONSTRUCTING TRAINING SETS FOR ELECTRONIC SENTIMENT ANALYSIS

REFERENCE TO RELATED APPLICATION

This claims the benefit of priority under 35 U.S.C. §119 (e) to U.S. Provisional Patent Application No. 62/190,723, titled "Automatic Construction of Training Sets for Computerized Text Sentiment Analysis" and filed Jul. 9, 2015, and the benefit of priority under 35 U.S.C. §119(b) to Indian Provisional Patent Application No. 1551/DEL/2015, titled "Automatic Construction of Training Sets for Computerized Text Sentiment Analysis" and filed May 29, 2015, the entirety of each of which are hereby incorporated by reference herein.

TECHNICAL FIELD

The present disclosure relates generally to electronic sentiment analysis. More specifically, but not by way of limitation, this disclosure relates to automatically constructing training sets for electronic sentiment analysis.

BACKGROUND

With the rise of the Internet and mobile electronic devices, users are generating increasing amounts of electronic content. Electronic content often takes the form of forum posts, text messages, social networking posts, blog posts, e-mails, chatroom discussions, or other electronic communications. In many cases, users express their sentiment (e.g., opinion, feeling, emotion, or attitude) about a thing, company, or other topic within the electronic content.

SUMMARY

In one example, a computer readable medium comprising program code executable by a processor is provided. The program code can cause the processor to receive an electronic communication usable for training a neural network and comprising a plurality of characters. The program code can cause the processor to receive a sentiment dictionary comprising a plurality of expressions mapped to a plurality of sentiment values representing different sentiments. Each expression of the plurality of expressions can be mapped to a corresponding sentiment value of the plurality of sentiment values. The program code can cause the processor to determine an overall sentiment for the electronic communication using the sentiment dictionary. The program code can cause the processor to automatically construct training data usable for training the neural network based at least in part on the overall sentiment of the electronic communication. The training data can comprise a plurality of overall sentiments associated with a plurality of electronic communications usable for training the neural network. The program code can cause the processor to train the neural network using the training data. The program code can cause the processor to receive a second electronic communication comprising an unknown sentiment. The program code can cause the processor to determine at least one sentiment associated with the second electronic communication using the neural network.

In another example, a method is provided that can include receiving an electronic communication usable for training a neural network and comprising a plurality of characters. The method can include receiving a sentiment dictionary comprising a plurality of expressions mapped to a plurality of sentiment values representing different sentiments. Each expression of the plurality of expressions can be mapped to a corresponding sentiment value of the plurality of sentiment values. The method can include determining an overall sentiment for the electronic communication using the sentiment dictionary. The method can include automatically constructing training data usable for training the neural network based at least in part on the overall sentiment of the electronic communication. The training data can comprise a plurality of overall sentiments associated with a plurality of electronic communications usable for training the neural network. The method can include training the neural network using the training data. The method can include receiving a second electronic communication comprising at least one unknown sentiment. The method can include determining at least one sentiment associated with the second electronic communication using the neural network.

In another example, a system is provided that can include a processing device and a memory device. The memory device can include instructions executable by the processing device for causing the processing device to receive an electronic communication usable for training a neural network and comprising a plurality of characters. The instructions can cause the processing device to receive a sentiment dictionary comprising a plurality of expressions mapped to a plurality of sentiment values representing different sentiments. Each expression of the plurality of expressions can be mapped to a corresponding sentiment value of the plurality of sentiment values. The instructions can cause the processing device to determine an overall sentiment for the electronic communication using the sentiment dictionary. The instructions can cause the processing device to automatically construct training data usable for training the neural network based at least in part on the overall sentiment of the electronic communication. The training data can comprise a plurality of overall sentiments associated with a plurality of electronic communications usable for training the neural network. The instructions can cause the processing device to train the neural network using the training data. The instructions can cause the processing device to receive a second electronic communication comprising at least one unknown sentiment. The instructions can cause the processing device to determine at least one sentiment associated with the second electronic communication using the neural network.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures:

FIG. 7 is a table showing an example of blocks of characters and their corresponding overall sentiments according to some aspects.

Figure 1:
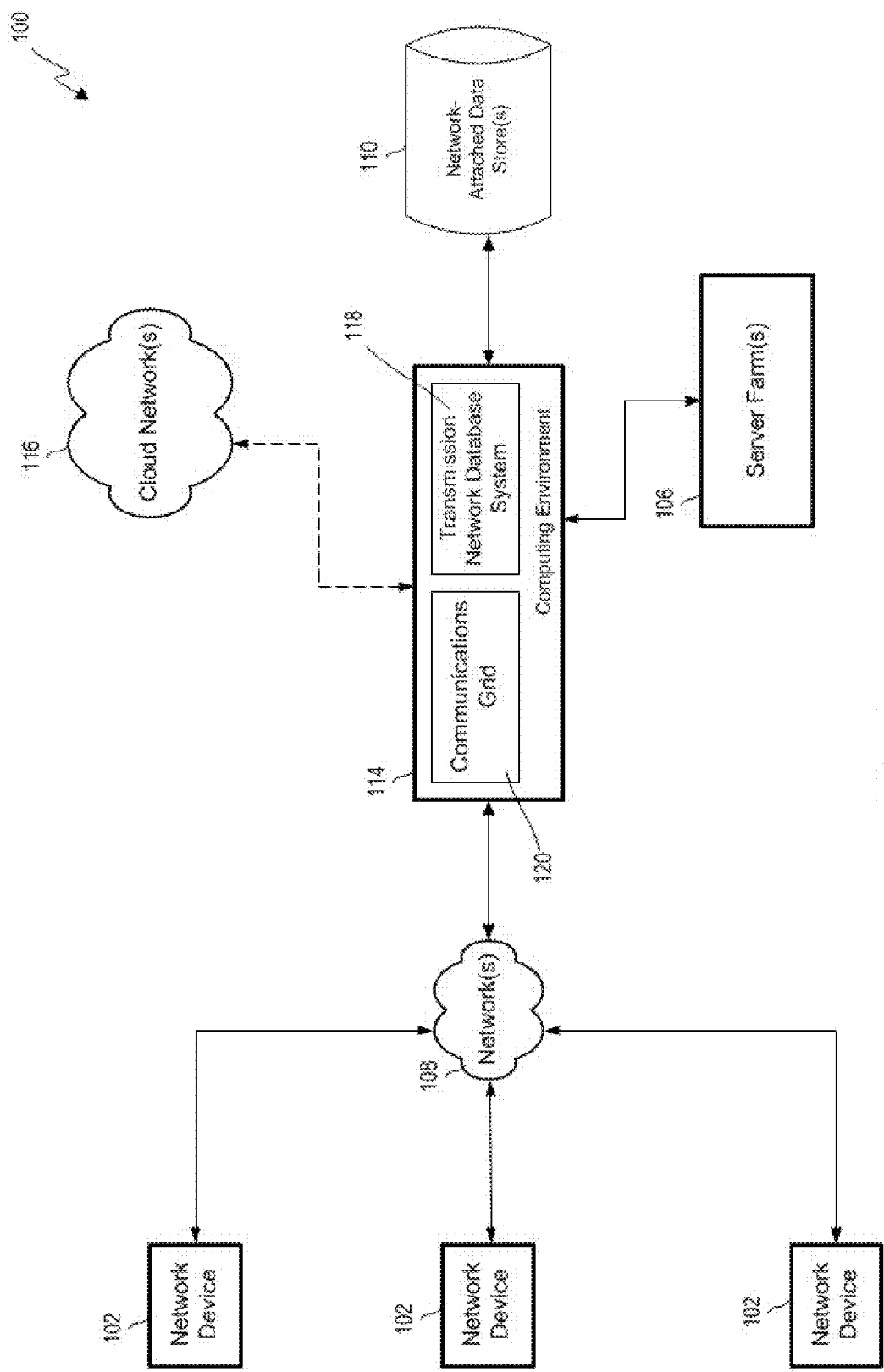
FIG. 1 is a block diagram of an example of the hardware components of a computing system according to some aspects.

In the appended figures, similar components or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of examples of the technology. But various examples can be practiced without these specific details. The figures and description are not intended to be restrictive.

The ensuing description provides examples only, and is not intended to limit the scope, applicability, or configuration of the disclosure. Rather, the ensuing description of the examples provides those skilled in the art with an enabling description for implementing an example. Various changes may be made in the function and arrangement of elements without departing from the spirit and scope of the technology as set forth in the appended claims.

Specific details are given in the following description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples can be described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but can have additional operations not included in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

Certain aspects and features of the present disclosure relate to automatically constructing a training set for electronic sentiment analysis. A computing device can automatically construct the training set using data from multiple electronic communications. Examples of an electronic communication can include a text message, an e-mail, an electronic document, a social media post (e.g., a Twitter™ tweet, a Facebook™ post, etc.), a blog post, a forum post, a chat log, or any combination of these. In some examples, for each electronic communication, the computing device can break the electronic communication up into smaller segments, determine a total sentiment score associated with each segment using a sentiment dictionary, and aggregate the total sentiment scores from all of the segments to determine an aggregate sentiment score for the electronic document. Based on the aggregate sentiment score, the computing device can determine an overall sentiment (e.g., a positive sentiment, a negative sentiment, or a neutral sentiment) associated with the electronic communication. The computing device can include multiple electronic communications, their associated aggregate sentiment scores, their associated overall sentiments, or any combination of these in a data set. The data set can be used for training a neural network of a sentiment analysis program.

In some examples, the sentiment analysis program can perform sentiment analysis on another (e.g., a new) electronic communication that includes one or more unknown sentiments. The sentiment analysis program can determine and provide one or more predicted sentiments associated with the electronic communication.

Some examples can include a graphical user interface (GUI) through which one or more predicted sentiments can be visually displayed. In some examples, the predicted sentiments can be represented as points on a graph, such as a line graph. The points can be positioned on the graph such that each point indicates whether the point corresponds to a positive sentiment, a neutral sentiment, or a negative sentiment. Transitions between points can indicate transitions between sentiments. For example, a transition from a point indicating a positive sentiment to another point indicating a negative sentiment can represent a transition from the positive sentiment to the negative sentiment.

In some examples, a user can interact with the GUI. For example, a user can click on a point on the graph. The GUI can display a graphical object, such as a comment bubble, in response to the click. In some examples, the graphical object can include information associated with the point. As another example, a user can drag a point on the graph from a first location on the graph to a second location on the graph. The first location can correspond to an incorrect sentiment and the second location can correspond to a correct sentiment. Thus, the user can drag the point from the first location to the second location to correct the sentiment indicated by the point. In some examples, the data set used to train the neural network can be updated based on the corrected sentiment, and the neural network can be retrained using the updated data set. This can provide a feedback loop in which the sentiment analysis program can predict sentiments, the user can correct erroneous sentiment predictions, and the sentiment analysis program can be retrained based on the user's corrections to become more accurate.

FIGS. 1-4 depict examples of systems usable for automatically constructing training sets for electronic sentiment analysis. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices can transmit electronic messages for use in automatically constructing a training set for sentiment analysis, all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data usable to automatically construct a training set for electronic sentiment analysis to a network-attached data store 110 for storage. The computing environment 114 may later retrieve the data from the network-attached data store 110 and use the data to construct the training set, perform sentiment analysis on other data, or both.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as data from a website (e.g., a forum post, a Twitter™ tweet, a Facebook™ post, a blog post, an online review), a text message, an e-mail, or any combination of these.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the sever farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time. As another example, website data may be analyzed to determine one or more sentiments expressed in comments, posts, or other data provided by users.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for performing data analytics or sentiment analysis on data. Additionally or alternatively, the cloud network 116 may host an application for automatically constructing training sets for electronic sentiment analysis.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for normalizing electronic communications using neural networks. For example, the computing environment 114, a network device 102, or both can implement one or more versions of the processes discussed with respect to FIGS. 5, 9, and 10.

Figure 2:
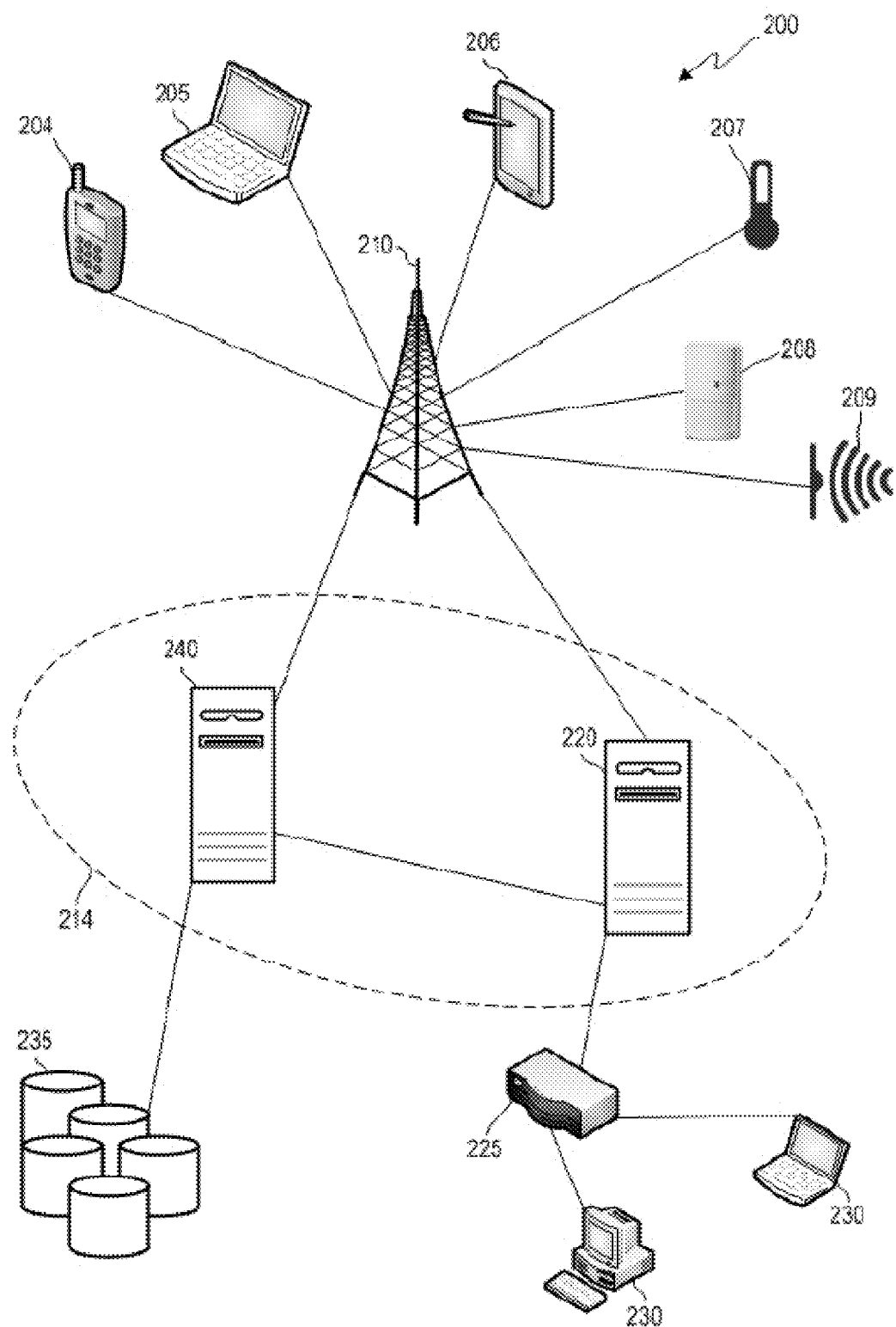
FIG. 2 is an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include data with one or more sentiments. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing (e.g., which can include automatically constructing a training set for electronic sentiment analysis using the data).

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project in which sentiment analysis is performed on data, the computing environment 214 can perform a pre-analysis of the data. The pre-analysis can include determining whether the data has previously undergone sentiment analysis. Additionally or alternatively, the pre-analysis can include determining whether the data is in a correct format for sentiment analysis and, if not, reformatting the data into the correct format.

Figure 3:
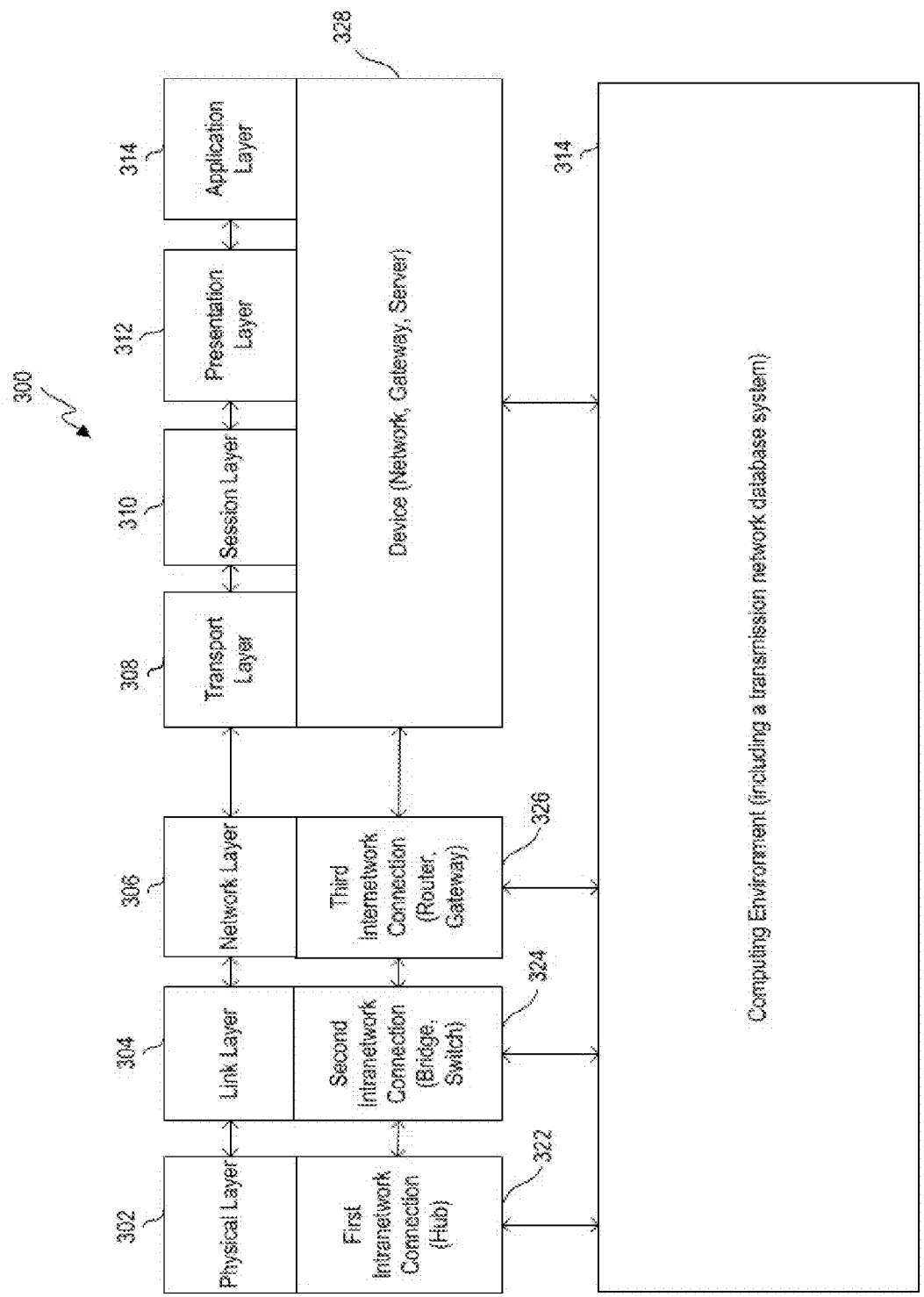
FIG. 3 is a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes at least one sentiment to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as a sentiment analysis application, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314. For example, routers can operate in the network layer and network devices can operate in the transport, session, presentation, and application layers.

A computing environment 330 can interact with or operate in, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for automatically constructing training sets for electronic sentiment analysis.

Figure 4:
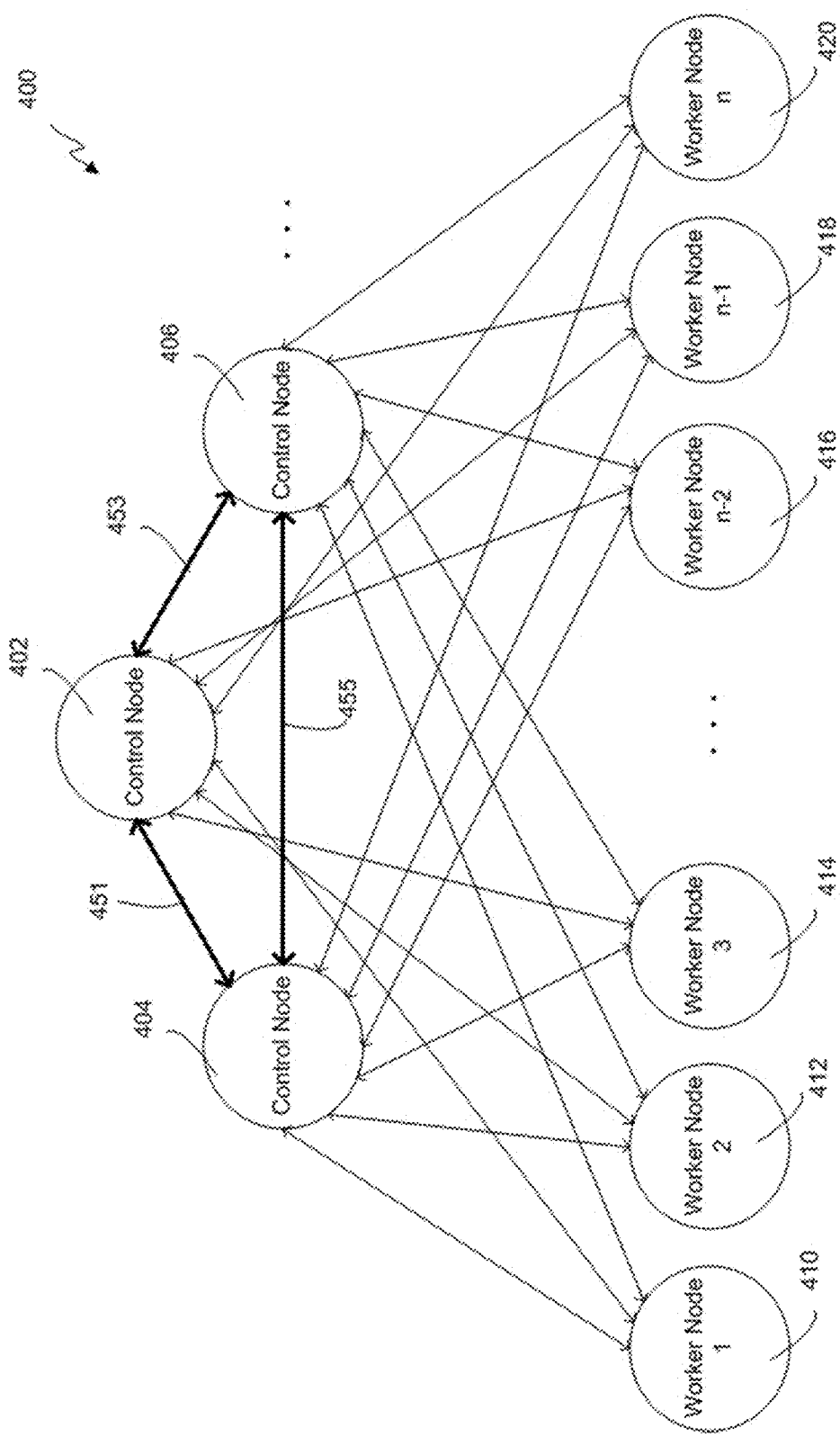
FIG. 4 is a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a sentiment analysis job being performed or an individual task within a sentiment analysis job being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 412-420 in the communications grid, even if the other worker nodes 412-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a sentiment analysis project or a training set construction project. The project may include a data set. The data set may be of any size. Once the control node 402-406 receives such a project including a large data set, the control node may distribute the data set or projects related to the data set to be performed by worker nodes. Alternatively, for a project including a large data set, the data set may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project for automatically constructing training sets for electronic sentiment analysis can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 412 may perform sentiment analysis on a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 412-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, a communications grid computing system 400 can be used to automatically construct a training set for electronic sentiment analysis.

Figure 5:
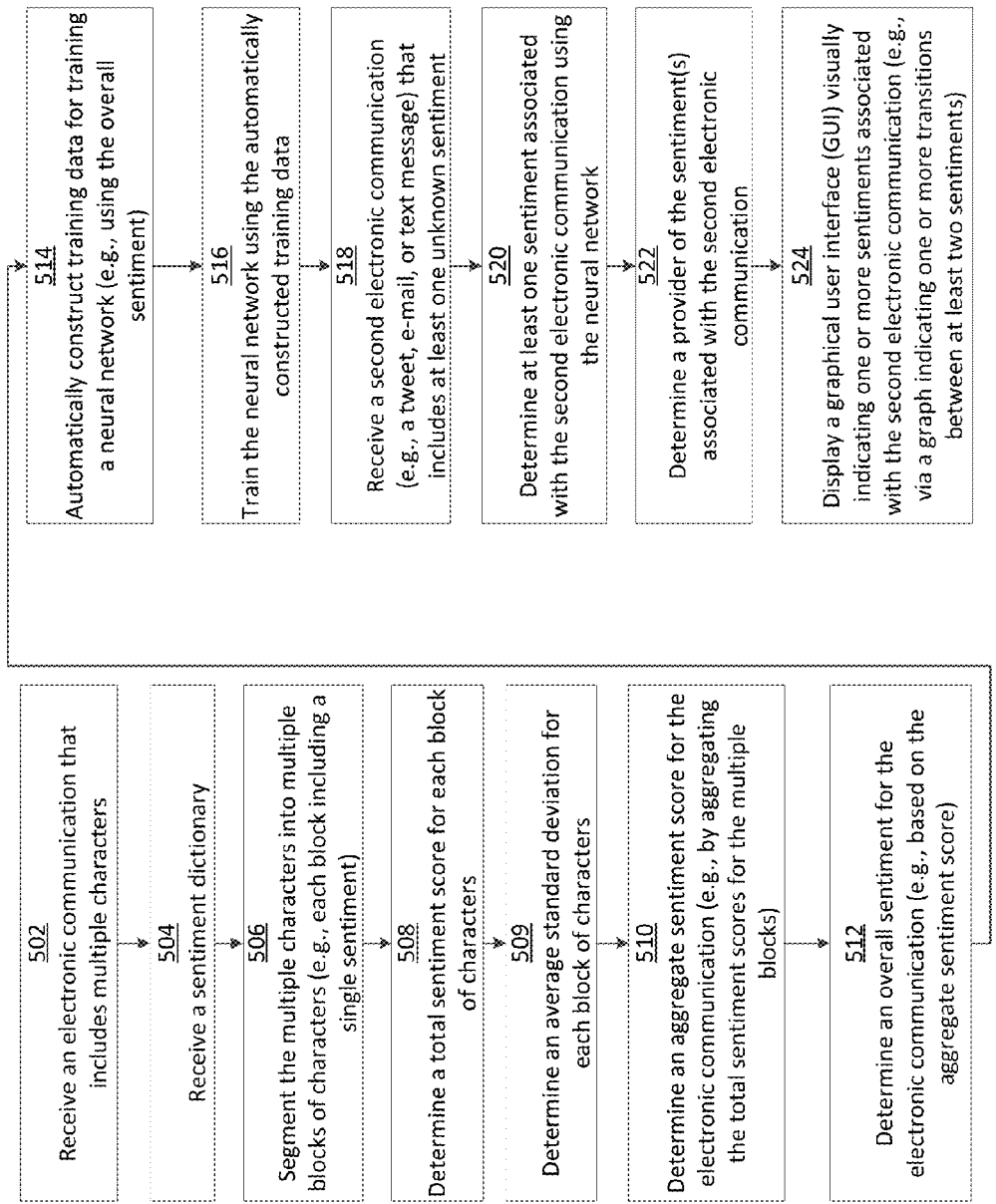
FIG. 5 is a flow chart of an example of a process for automatically constructing training sets for electronic sentiment analysis according to some aspects.

FIG. 5 is a flow chart of an example of a process for automatically constructing training sets for electronic sentiment analysis according to some aspects. Some examples can be implemented using any of the systems and configurations described with respect to FIGS. 1-4.

In block 502, a processor receives an electronic communication that includes multiple characters. Examples of the electronic communication can include a text message, an e-mail, an electronic document, a social media post (e.g., a Twitter™ tweet, a Facebook™ post, etc.), a blog post, a forum post, a chat log, or any combination of these. For example, the processor can receive a chat log that includes a discussion between two users about a company or product. The electronic communication can be in any language, such as English, French, German, Spanish, etc.

The processor can receive the electronic communication from a remote electronic device, such as a remote computing device or server. For example, the processor can access a remote database and submit one or more queries (e.g., SQL queries) to obtain desired data. The remote database can respond by transmitting the electronic communication to the processor. The electronic communication can include the desired data.

In some examples, the processor may reformat, clean, or otherwise pre-process at least a portion of the data from the electronic communication. For example, if the electronic communication includes webpage data, the processor can extract the text of the webpage from the programming data (e.g., HyperText Markup Language, JavaScript, or Cascading Style Sheet data). As another example, the processor can aggregate data or electronic communications from various sources into a single data set or electronic communication for later use.

In some examples, the electronic communication can be used for training a neural network. For example, at least a portion of the data from the electronic communication can be used for automatically constructing a training set used for training the neural network. This is described in greater detail with respect to block 516.

In block 504, the processor can receive a sentiment dictionary. The processor can receive the sentiment dictionary from a remote electronic device, such as a remote computing device or server. For example, the processor can download the sentiment dictionary from a remote server.

The sentiment dictionary can include a database in which expressions (e.g., words) are mapped to corresponding sentiment values. A sentiment value can be a numerical value representative of a sentiment (e.g., an opinion, feeling, emotion, or attitude) associated with a particular expression. In some examples, the sentiment value can be a number between 1 and 9. For example, the expression "hate" can be mapped to a sentiment value of 7.8 in the sentiment dictionary. In some examples, separate sentiment dictionaries can be used for different languages. For example, one sentiment dictionary can be used for English expressions, another sentiment dictionary can be used for Spanish expressions, still another sentiment dictionary can be used for French expressions, etc.

In some examples, the sentiment dictionary can map an expression to two or more values. For example, the sentiment dictionary can map an expression to a pleasure value. The pleasure value can represent a level to which the expression is used to convey a pleasant or an unpleasant sentiment. The pleasure value can be a number between 1 and 9. The sentiment dictionary can additionally or alternatively map the expression to an activation value. The activation value can represent a level to which the expression is used to convey an aroused sentiment or a sedated sentiment. The sentiment dictionary can additionally or alternatively map the expression to a dominance value. The dominance value can represent a level to which a particular expression influences the sentiment of a text block including the expression. By mapping an expression to two or more values, more data can be associated with each expression.

In block 506, the processor can segment the multiple characters into multiple blocks of characters (e.g., segments). The processor can segment or divide the multiple characters into the blocks of characters based on one or more criteria. For example, the processor can segment the multiple characters into blocks of characters such that each block of characters includes a single sentiment, a single topic, a single sentence, or any combination of these.

As discussed above, the processor can divide the multiple characters into the blocks such that each block includes a single sentence. For example, the processor can search the multiple characters for punctuation marks and divide the multiple characters into blocks based on the locations of the punctuation marks. In one such example, the processor can segment "I looked out my window. It was a beautiful day." into two blocks of characters, one block of characters including "I looked out my window" and another block of characters including "It was a beautiful day." In some examples, by dividing the electronic communication into blocks of characters in which each block of characters includes a single sentence, it may increase the likelihood that each block of characters includes only a single sentiment (e.g., a positive, negative, or neutral sentiment). For example, it may be more likely that single sentence includes a single uniform sentiment than multiple sentences. It can be desirable to have each block of characters include only a single sentiment, as this can reducing the likelihood of multiple different sentiments within a single block of characters canceling each other out. Reducing the likelihood of multiple different sentiments canceling each other out can improve the accuracy of the system. Thus, in some examples, each block of characters can include a single sentence indicating or expressing a single sentiment.

In block 508, the processor can determine a total sentiment score for each block of characters. In some examples, the processor can determine the total sentiment score for each block of characters according to the process shown in FIG. 6.

Figure 6:
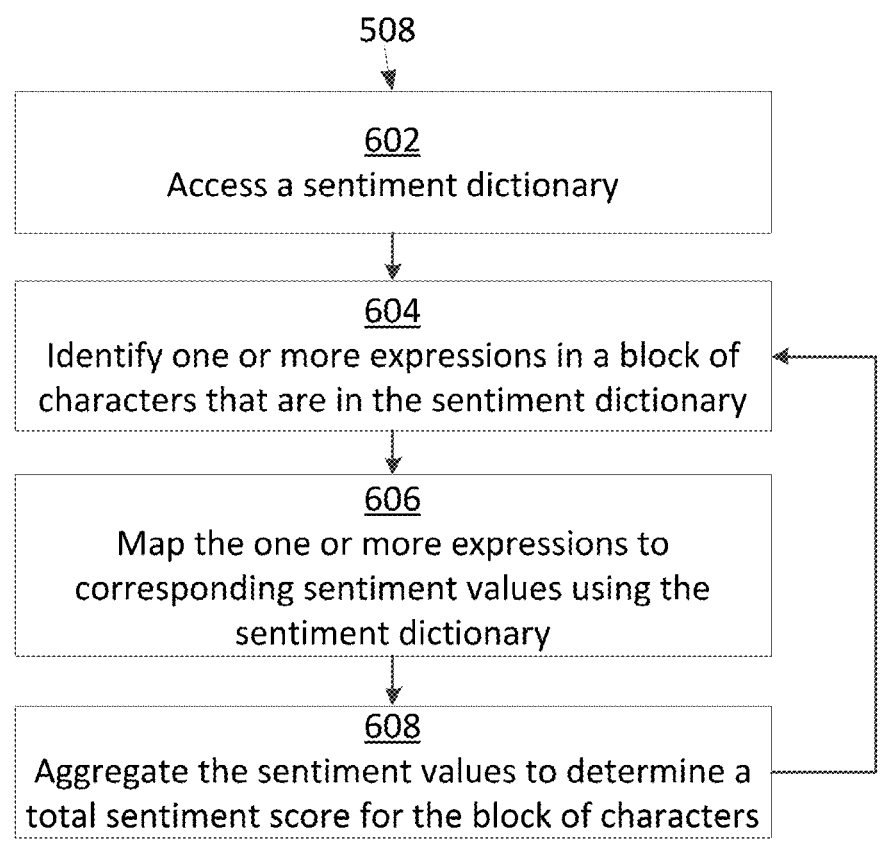
FIG. 6 is a flow chart of an example of a process for determining a total sentiment score for a block of characters according to some aspects.

Referring to FIG. 6, in block 602, the processor can access a sentiment dictionary (e.g., the sentiment dictionary received in block 504 of FIG. 5). In some examples, the sentiment dictionary can be stored locally in a local memory device. The processor can retrieve the sentiment dictionary from the local memory device. In other examples, the sentiment dictionary can be stored remotely and accessible via a network, such as over the Internet. The processor can transmit one or more queries or other communications to one or more remote devices to access the sentiment dictionary.

In block 604, the processor can identify one or more expressions in a block of characters that are in the sentiment dictionary. For example, the processor can identify one or more words within a block of characters (e.g., generated in block 506 of FIG. 5) that are within the sentiment dictionary. In one example, the processor can analyze a block of characters including the sentence "This is absolutely terrible news" for expressions that are in the sentiment dictionary. The processor can determine that the expressions "absolutely" and "terrible" are within the sentiment dictionary.

In block 606, the processor can map the one or more expressions to corresponding sentiment values using the sentiment dictionary. For example, the processor can map the expression "absolutely" to a corresponding sentiment value of 6.3. The processor can additionally or alternatively map the expression "terrible" to a corresponding sentiment value of 1.9.

In some examples, the processor can map one or more sentiment values to a corresponding standard deviation using the sentiment dictionary. For example, the sentiment dictionary can include an expression mapped to a corresponding sentiment value and standard deviation. The standard deviation can represent the agreement (or disagreement) among a group of human evaluators as to the "correct" sentiment value for the particular expression. For example, to build the sentiment dictionary, each participant in a group of human evaluators may assign a sentiment value to an expression in the sentiment dictionary. But the inherent subjectivity of such a method may cause the assigned sentiment values to vary. In some examples, a standard deviation of the assigned sentiment values can be calculated and included in the sentiment dictionary. A higher standard deviation associated with a particular expression can indicate a higher amount of disagreement between the human evaluators as to the "correct" sentiment value for the expression, and a lower standard deviation associated with a particular expression can indicate a lower amount of disagreement between the human evaluators as to the "correct" sentiment value for the expression.

In block 608, the processor can aggregate (e.g., statistically aggregate, average, or otherwise combine) the sentiment values to determine a total sentiment score for the block of characters. For example, the processor can average the sentiment value of 6.3 for the expression "absolutely" and the sentiment value 1.9 for the expression "terrible" to determine the total sentiment score of 4.1.

In some examples, the processor can aggregate weighted sentiment values to determine the total score for the block of characters. The processor can weight each sentiment value based on a standard deviation corresponding to the sentiment value. For example, the processor can multiply sentiment values associated with lower standard deviations by larger weighting factors. The processor can multiply sentiment values associated with higher standard deviations by smaller weighting factors. The processor can aggregate the weighted sentiment values to determine the total sentiment score for the block of characters.

In examples in which the sentiment dictionary includes a pleasure value, an arousal value, or both, the processor can determine multiple total scores for the block of characters. For example, the processor can aggregate the pleasure values for the one or more expressions to determine a total pleasure score. The processor can additionally or alternatively aggregate the arousal values for the one or more expressions to determine a total arousal value. The processor can determine the total sentiment score based on the total pleasure value, the total arousal value, or both. For example, the processor can use the total pleasure value or the total arousal value as the total sentiment score.

Returning to FIG. 5, in block 509, the processor determines an average standard deviation for each block of characters. For example, the processor can access the sentiment dictionary and determine a standard deviation corresponding to each sentiment value associated with a particular block of characters. The processor can determine an average of the standard deviations. This can be the average standard deviation for the block of characters.

In block 510, the processor determines an aggregate sentiment score for the electronic communication. The processor can determine the aggregate sentiment score by aggregating the total sentiment scores for the blocks of characters.

In some examples, the processor can aggregate weighted total sentiment scores to determine the aggregate sentiment score. For example, the processor can multiply a larger weighting factor by a total sentiment score corresponding to a block of characters associated with a lower average standard deviation. The processor can multiply a smaller weighting factor by a total sentiment score corresponding to a block of characters associated with a larger average standard deviation. The processor can aggregate the weighted total sentiment scores to determine the aggregate sentiment score for the electronic communication.

For example, if one block of characters is associated with a total sentiment score of 3.7 and an average standard deviation of 2.5, the processor can multiply the total sentiment score by a weighting factor of 0.76. If another block of characters is associated with a total sentiment score of 4.2 and a standard deviation of 7.5, the processor can multiply the total sentiment score by a weighting factor of 0.24. The processor can aggregate the weighted total sentiment scores to determine an aggregate sentiment score of 3.8.

In block 512, the processor determines an overall sentiment for the electronic communication (e.g., based on the aggregate sentiment score). The overall sentiment can include positive, negative, or neutral. For example, the processor can determine whether the aggregate sentiment score falls within a range of sentiment scores. If so, the processor can determine that the overall sentiment for the electronic communication is neutral. If the processor determines that the aggregate sentiment score exceeds the range of sentiment scores, the processor can determine that the overall sentiment for the electronic communication is positive. If the processor determines that the aggregate sentiment score is below the range of sentiment scores, the processor can determine that the overall sentiment for the electronic communication is negative.

In some examples, the processor can determine an overall sentiment for one or more blocks of characters of the electronic communication. The processor can determine the overall sentiment for a block of characters based on an associated total sentiment score. For example, the processor can determine whether the total sentiment score for the block of characters falls within a range of sentiment scores. If so, the processor can determine that the overall sentiment for the block of characters is neutral. If the processor determines that the total sentiment score for the block of characters exceeds the range of sentiment scores, the processor can determine that the overall sentiment for the block of characters is positive. If the processor determines that the total sentiment score for the block of characters is below the range of sentiment scores, the processor can determine that the overall sentiment for the block of characters is negative. For instance, FIG. 7 is a table 700 showing an example of blocks of characters and their corresponding overall sentiments. The table 700 can include two or more columns 702, 704. One column 702 can include a block of characters. Each block of characters can represent an individual sentence, such as a sentence segmented from a chat communication between two participants (e.g., a user of a product and a representative of a company). One or more expressions within each block of characters can be mapped to sentiment values in a sentiment dictionary. The sentiment values can be used to determine a total sentiment score for the block of characters. The total sentiment score can indicate an overall sentiment for the block of characters as positive, neutral, or negative. The corresponding overall sentiment for each block of characters is shown in column 704.

In block 514 of FIG. 5, the processor automatically constructs training data (e.g., a training set) for training a neural network. The processor can automatically construct the training data using, at least in part, a total sentiment score for a block of characters, an overall sentiment for a block of characters, the aggregate sentiment score for the electronic communication, the overall sentiment for the electronic communication, or any combination of these. For example, the processor can include a total sentiment score, an aggregate sentiment score, or an overall sentiment associated with the electronic communication in a database or data set used for training the neural network.

In some examples, the processor can perform the operations of blocks 502-512 on multiple electronic communications. The processor can automatically construct the training data using, at least in part, a total sentiment score, an aggregate sentiment score, an overall sentiment, or any combination of these associated with each electronic communication. For example, the processor can include a total sentiment score, an aggregate sentiment score, or an overall sentiment associated with each electronic communication in a database or data set. The database or data set can be used for training the neural network.

In block 516, the processor trains the neural network using the automatically constructed training data. The neural network can include one or more computer-implemented algorithms or models. Typically, neural networks can be represented as one or more layers of interconnected "neurons" that can exchange data between one another. The connections between the neurons can have numeric weights that can be tuned based on experience. Such tuning can make neural networks adaptive and capable of "learning." Tuning the numeric weights can increase the accuracy of output provided by the neural network.

The numeric weights can be tuned through a process referred to as training. In some examples, the processor can train the neural network using the training data automatically constructed in block 514. The processor can provide the training data to the neural network, and the neural network can use the training data to tune one or more numeric weights of the neural network.

In some examples, the neural network can be trained using backpropagation. Backpropagation can include determining a gradient of a particular numeric weight based on a difference between an actual output of the neural network and a desired output of the neural network. Based on the gradient, one or more numeric weights of the neural network can be updated to reduce the difference, thereby increasing the accuracy of the neural network. In some examples, this process can be repeated multiple times to train the neural network.

In block 518, the processor receives a second electronic communication (e.g., a social media post, a chat log, a news article, etc.). The second electronic communication can include at least one unknown sentiment. It may be desirable to determine one or more sentiments associated with the second electronic communication. In some examples, the processor can perform sentiment analysis on the second electronic communication using the neural network to determine one or more sentiments associated with the second electronic communication.

In block 520, the processor determines at least one sentiment associated with the second electronic communication using the neural network. For example, the neural network can be part of a sentiment analysis program or tool, such as SAS Text Analytics™ (from SAS Institute, Inc.™ of Cary, N.C., USA). The processor can execute the sentiment analysis program using the second electronic communication as an input for the sentiment analysis program. The sentiment analysis program can determine, using the neural network, at least one sentiment associated with the second electronic communication using the neural network.

In some examples, the processor can segment the second electronic communication into multiple blocks of characters. The processor can segment the second electronic communication using any of the methods discussed above (e.g., in block 506). For example, the processor can segment the second electronic communication into block of characters, where each block of characters can include a single sentence, a single unknown sentiment, a single topic, or any combination of these. The processor can, using the neural network, analyze a block of characters to determine a corresponding sentiment expressed in the block of characters. The processor can repeat this process for all the blocks of characters, thereby determining multiple sentiments associated with the second electronic communication. This can provide a more granular level of sentiment analysis than, for example, determining a single sentiment associated with the entire second electronic communication as a whole.

In block 522, the processor determines a provider of the sentiment(s) associated with the second electronic communication. For example, the processor can analyze data (e.g., metadata) associated with the second electronic communication to determine a particular person, entity, user, and/or other provider associated with a particular sentiment (e.g., as determined in block 520) expressed in the second electronic communication.

For example, the second electronic communication can include a chat session between two or more participants. The processor can determine sentiments associated with different lines in the chat session. The processor can also analyze data associated with the chat session to determine which participant is associated with each of the determined sentiments. The processor can store associations between the determined sentiments and the corresponding providers in memory. The processor can determine any number of providers for any number of sentiments.

Figure 8:
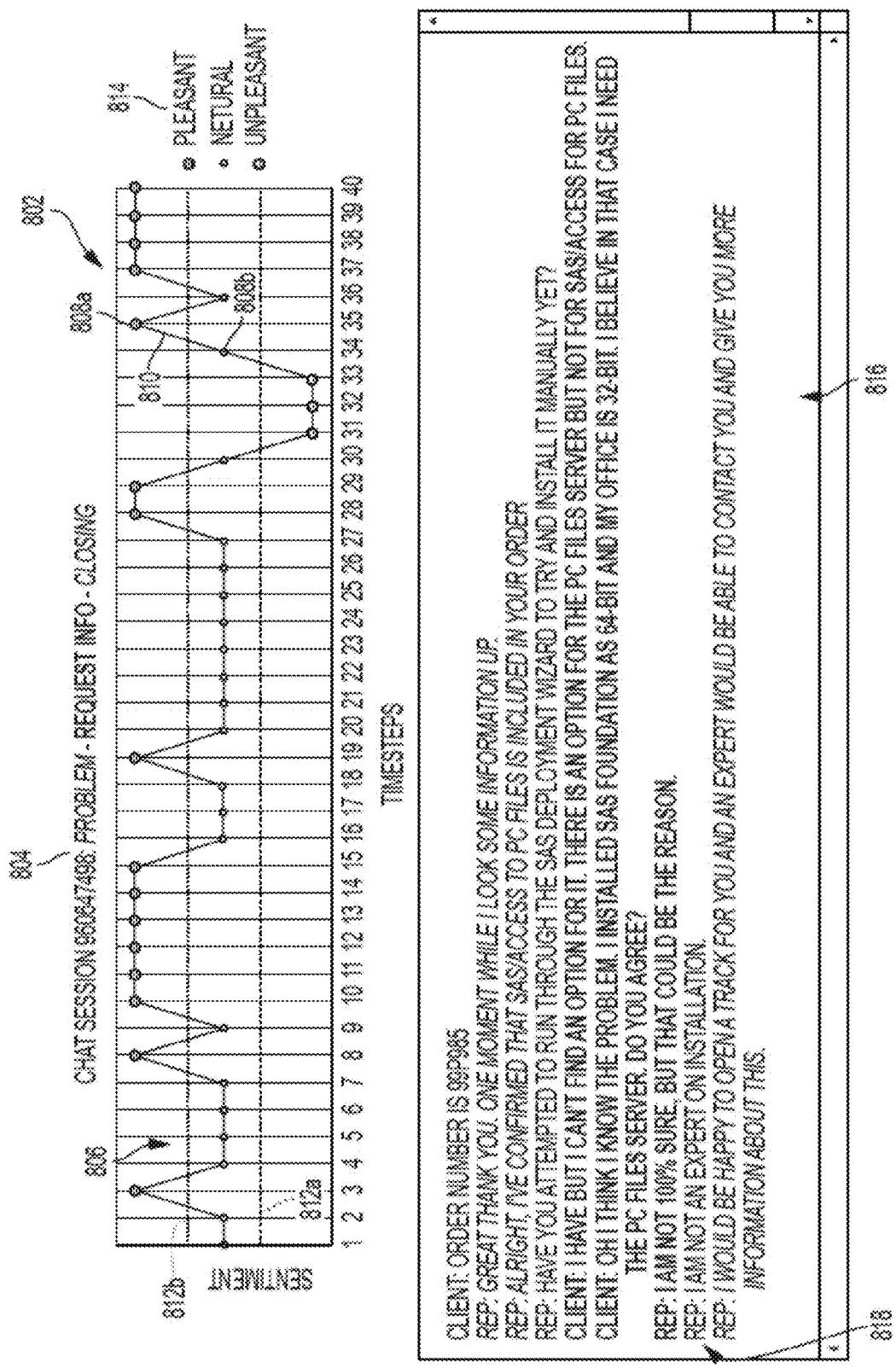
FIG. 8 is an example of a graphical user interface (GUI) showing multiple sentiments associated with a chat session between two users according to some aspects.

In block 524, the processor can cause a display device (e.g., a computer monitor, television, touch-screen display, liquid crystal display, etc.) to display a graphical user interface (GUI). The GUI can visually indicate one or more sentiments associated with the second electronic communication. In some examples, the GUI can visually indicate the one or more sentiments via a graph, such as a line graph. For example, FIG. 8 is an example of a GUI 802 showing multiple sentiments associated with a chat session between two users (e.g., the entirety of which can make up the second electronic communication) according to some aspects. The two users can include a customer of a company and a representative of the company. The GUI 802 can include a graph 806 visually indicating one or more sentiments associated with one or more portions of the chat session. For example, each point on the graph 806 can correspond to a line or sentence of the chat session and represent a positive sentiment, a negative sentiment, or a neutral sentiment.

The graph 806 can include a timeline along the X-axis and a sentiment value along the Y-axis. As shown in FIG. 8, the timeline can include segment numbers (e.g., the first segment can be at time 1, the second segment can be at time 2, etc.). In other examples, the time along the X-axis can include a time that the segment was created. For example, the time along the X-axis can include timestamps indicating when each sentence in the chat session was typed. This can provide a user with information, such as how long each sentence took to type during the chat session or the duration of delays between responses by participants in the chat.

In some examples, each point on the graph can include a shape. The shape can be a circle, square, rectangle, triangle, or other shape. In some examples, the shape can indicate a source of a corresponding segment. For example, a triangle-shaped point can indicate that a corresponding sentence of the chat session was typed by the customer. A circle-shaped point can indicate that a corresponding sentence of the chat session was typed by the representative of the company.

In some examples, the GUI 802 can visually indicate at least one transition between at least two sentiments. For example, the graph 806 can visually indicate a transition 810 between point 808*b* and point 808*a*. This transition 810 can visually represent a transition between a neutral sentiment (e.g., as indicated by point 808*b*) and a positive sentiment (e.g., as indicated by point 808*a*). The graph 806 can allow the user to visually determine a flow of sentiments associated with the chat session over time and identify locations in this chat session where the sentiment changes, where the sentiment varies rapidly, where the sentiment remains constant, or any combination of these.

In some examples, the GUI 802 can include a lower boundary 812*a*, an upper boundary 812*b*, or both indicating a range of values. In one example, points above the range of values, such as point 808*a*, can represent a pleasant or positive sentiment. Points within the range, such as 808*b*, can represent a neutral sentiment. Points below the range of values can represent an unpleasant or negative sentiment.

In some examples, the GUI 802 can include at least a portion of the chat session transcript 818. The portion of the chat session transcript 818 can be positioned in a scrollable window or frame 816. In some examples, each line in the chat session transcript 818 can be color coded or otherwise visually indicate whether the line is associated with a positive sentiment, a negative sentiment, or a neutral sentiment (e.g., via italicized, regular, or bold font, respectively). This can allow the user to visually determine a sentiment associated with a particular portion of the chat session transcript quickly. The GUI 802 can additionally or alternatively include other information 804, such as a customer number, a chat session number, a problem characterization, a status, etc.

In some examples, GUI 802 can combine multiple sources and types of information into a single visualization that is easy to understand for users. For example, a sentiment can be represented by a color and/or position of a point 808*a* on a graph 806, and a provider of the sentiment (e.g. a customer or representative in a chat) can be represented by a shape of the point 808*a* (e.g. circle, square, triangle, and so on). This may allow a user to see both the sentiment and the segment's provider in a single visualization. This can reduce the need for extensive training for users to understand and explore the sentiment analysis results.

Figure 9:
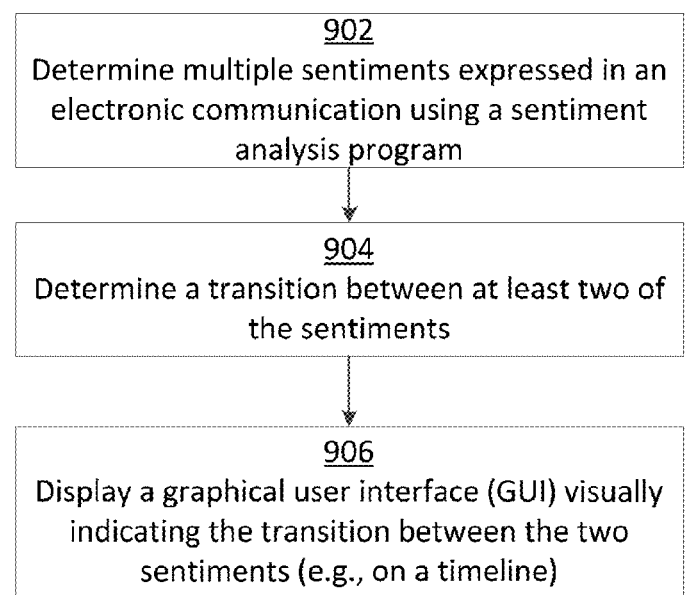
FIG. 9 is a flow chart of an example of a process for generating a GUI according to some aspects.

FIG. 9 is a flow chart of an example of a process for generating a GUI according to some aspects. In block 902 of FIG. 9, the processor can determine multiple sentiments expressed in an electronic communication using a sentiment analysis program. For example, the processor can receive an electronic communication including a chat transcript from a chat session. The processor can divide the chat transcript into multiple segments (e.g., with each segment including a single sentence or line in the chat transcript). The processor can execute the sentiment analysis program using the segments as inputs and determine a sentiment associated with each segment. The sentiment can be a positive sentiment, a neutral sentiment, or a negative sentiment.

In block 904, the processor can determine a transition between at least two of the sentiments. The transition can indicate a change between the two different sentiments occurring over a period of time. For example, the processor can determine the transition between a positive sentiment and a negative sentiment occurring over a period of time within the chat session.

In block 906, the processor can cause a display device to display a GUI that visually indicates the transition between the at least two sentiments. The processor can visually indicate the transition on a timeline including a timeframe associated with multiple segments of the electronic communication.

For example, the processor can cause the display device to output a GUI that includes a graph. The graph can include a timeline along the X-axis. The graph can include a sentiment value, such as a pleasure value or arousal value, along the Y-axis. One point on the graph can indicate one sentiment. Another point on the graph can indicate another sentiment. A line connecting the points can visually the transition between the sentiments.

Figure 10:
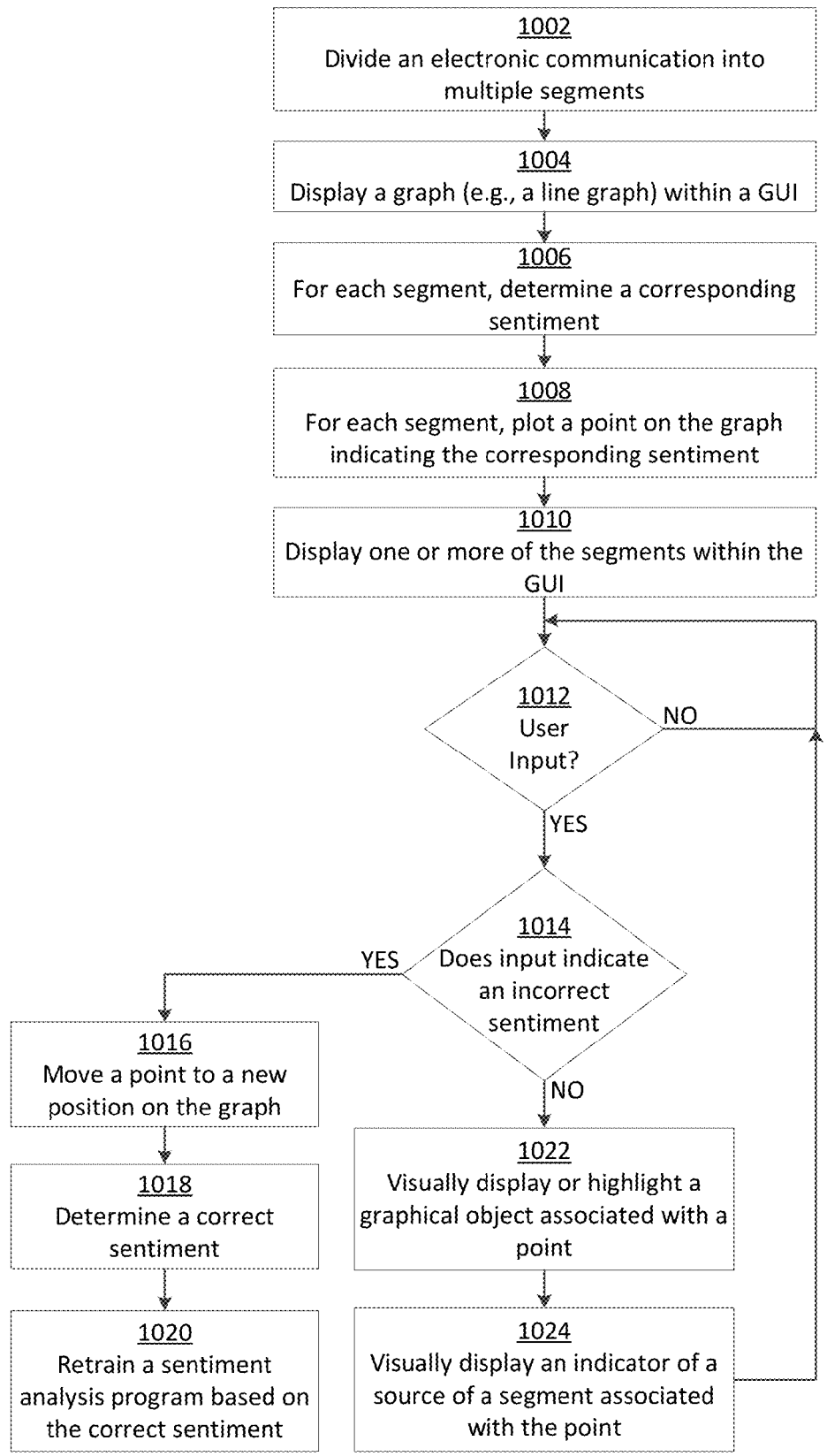
FIG. 10 is a flow chart of an example of another process for generating a GUI according to some aspects.

FIG. 10 is a flow chart of an example of another process for generating a GUI according to some aspects. In some examples, the operations of the process shown in FIG. 10 can be used in combination with one or more operations shown in FIG. 9.

In block 1002, the processor divides an electronic communication into multiple segments. For example, the processor can receive an electronic communication that includes a chat transcript from a chat session. The chat transcript can include multiple sentences or comments. The processor can divide the chat transcript into multiple segments, such that each segment includes a single sentence or comment from the chat transcript.

In block 1004, the processor causes a display device to display a graph within the GUI. For example, the processor can cause the display device to output a line graph within the GUI.

In block 1006, the processor determines a sentiment corresponding to each segment. For example, the processor can perform sentiment analysis on a segment to determine a corresponding sentiment. The processor can repeat this process for all the segments. The processor can perform the sentiment analysis using a sentiment analysis program that includes a neural network. The neural network can be trained using an automatically constructed training set.

In block 1008, the processor causes a point to be plotted on the graph indicating the corresponding sentiment for each segment. For example, the processor can position a point on the graph in a location indicative of the corresponding sentiment for a particular segment. In some examples, the processor can position each point on the graph above a reference line if the sentiment is positive, on the reference line if the sentiment is neutral, or below the reference line if the sentiment is negative. The processor can repeat this process for all of the sentiments. Thus, the graph can visually represent the various sentiments associated with the various segments from the electronic communication. For example, the graph can visually represent the various sentiments associated with different comments from a chat session.

In block 1010, the processor causes the display device to display one or more of the segments within the GUI. For example, referring to FIG. 8, the processor can cause the GUI to output the chat session transcript 818 in the GUI 802.

In block 1012, the processor determines if a user input was received. For example, the processor can be coupled to an input device, such as a touch-screen display, a touchpad, a keyboard, a mouse, a joystick, or a button. The processor can receive and analyze communications from the input device to determine if a user provided input. In some examples, the user input can include selecting or clicking on a particular point on the graph, hovering a cursor over a particular point on the graph, or dragging a point on the graph from one position to another position on the graph. If the processor determines that a user input was received, the process can continue to block 1014. Otherwise, the process can return to block 1012.

In block 1014, the processor determines if the user input indicates an incorrect sentiment. In some examples, the user can provide input via one or more GUI controls (e.g., by manipulating an input field, a virtual button, a virtual slider, or a virtual switch) indicating that a point on the graph corresponds to an incorrect sentiment. For example, the user can drag a point from one location to a new location on the graph. This may indicate that the point was originally in a position corresponding to an incorrect sentiment, and the new position may correspond to a correct sentiment. If the processor determines that the user input indicates an incorrect sentiment, the process can continue to block 1016. Otherwise, the process can continue to block 1022.

In block 1016, the processor moves a point to a new position on the graph. For example, if the user input includes dragging a point from one location to a new location on the graph, the processor can update the graph to show the point in the new location.

In block 1018, the processor determines a correct sentiment. For example, the processor can determine a correct sentiment based on the new position of the point on the graph. In some examples, the user can provide the correct sentiment via one or more GUI controls. For example, the user can manipulate one or more GUI controls via an input device, such as a touch-screen display, to input the correct sentiment. In response, the input device can transmit a communication associated with the correct sentiment to the processor. The processor can receive the communication and determine the correct sentiment based on the communication.

In block 1020, the processor retrains the sentiment analysis program based on the correct sentiment. For example, the processor can update the training data based on the correct sentiment. The processor can then retrain the neural network of the sentiment analysis program using the updated training data.

In some examples, the combination of blocks 1018-1020 can provide a feedback loop in which a user can identify and correct erroneous sentiments. For example, the user can identify a point on the graph that corresponds to an incorrect sentiment. The point can indicate that a corresponding segment of the electronic communication expresses one sentiment (e.g., a positive sentiment) when the corresponding segment actually expresses another sentiment (e.g., a negative sentiment or a neutral sentiment). The user can drag the point to a new location on the graph indicating a correct sentiment. In some examples, the processor can update the training data based on the correct sentiment. The processor can then retrain the sentiment analysis program using the updated training data, which can increase the accuracy of the sentiment analysis program. This feedback loop can leverage user insights to improve the accuracy of the sentiment analysis program.

Figure 11:
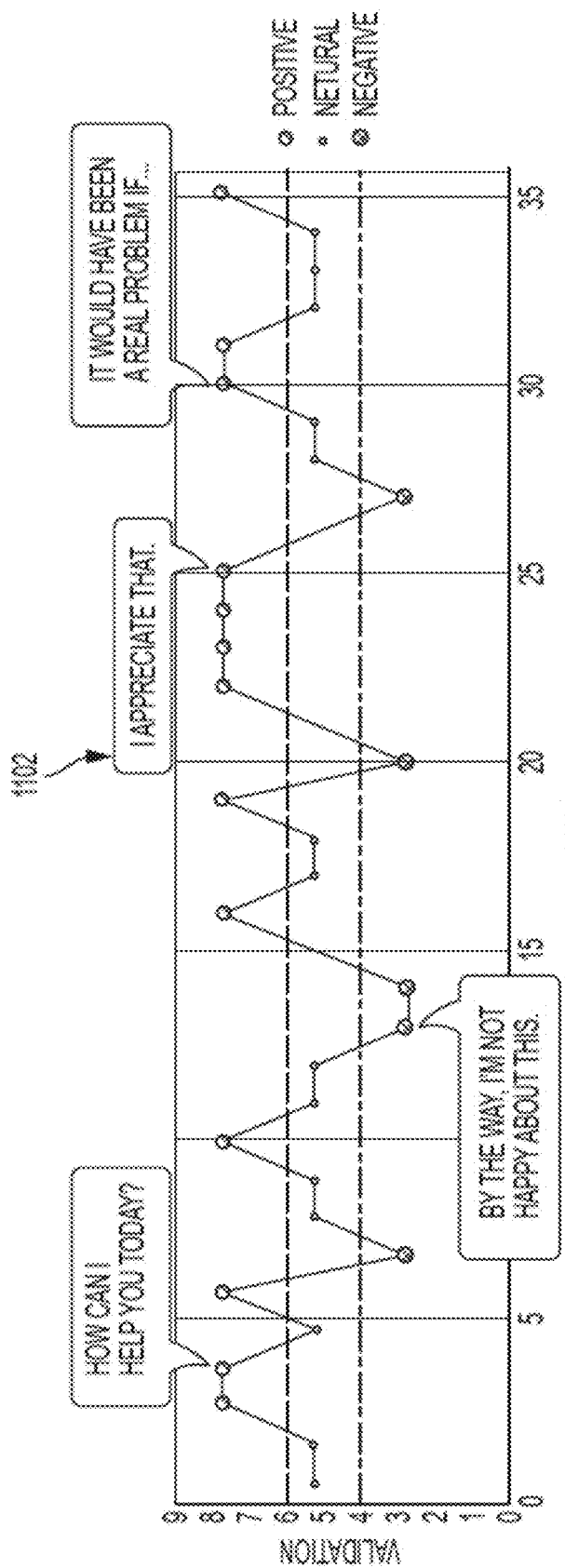
FIG. 11 is an example of a GUI showing multiple sentiments associated with a chat session according to some aspects.

In block 1022, the processor causes the GUI to visually display or visually highlight a graphical object associated with a point on the graph. In some examples, the graphical object can include a bubble. For example, referring to FIG. 11, the graphical object can include bubble 1102. The bubble 1102 can be positioned adjacent to the point. In some examples, the bubble 1102 can include a comment or a portion of the electronic communication corresponding to the point on the graph.

In some examples, the processor can cause the GUI to visually display or visually highlight the graphical object in response to determining that the user input includes selecting the point, clicking the point, hovering over the point (e.g., with a mouse cursor), or any combination of these. For example, the processor can cause the GUI to display the bubble 1102 in response to determining that the user input includes clicking the point. As another example, the processor can cause the GUI to highlight a segment of the electronic communication corresponding to the point and output within the GUI in response to determining that the user input includes hovering over the point. For example, referring to FIG. 8, the processor can cause the GUI to visually highlight a portion of the chat session transcript 818 corresponding to the point in response to determining that the user input includes hovering over the point. Such interactive features can provide a more immersive, comprehensive, and productive user experience.

In block 1024 of FIG. 10, the processor can cause the GUI to visually display an indicator of a source of a segment associated with the point. The indicator can include a graphical object (e.g., bubble 1102 of FIG. 11), a color, a shape, a shading, or any combination of these. In some examples, the source can include a particular user, for example, a particular user that engaged in a chat session. For example, the processor can cause the GUI to display a graphical object indicating a particular user that typed a particular message (in a chat session) corresponding to the point. As another example, the processor can cause the point to have a particular shape, shading, or color indicating that a particular user typed the message corresponding to the point. The indicator can be included within, or separate from, the graphical object displayed in block 1022.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A non-transitory computer readable medium comprising program code executable by a processor for causing the processor to:
    receive an electronic communication usable for training a neural network and comprising a plurality of characters;
    receive a sentiment dictionary comprising a plurality of expressions mapped to (i) a plurality of sentiment values representing different sentiments, (ii) a plurality of activation values representing different amounts of arousal, each expression of the plurality of expressions being mapped to a corresponding sentiment value of the plurality of sentiment values and a corresponding activation value of the plurality of activation values;
    determine a total sentiment score for the electronic communication by:
        segmenting the plurality of characters into a plurality of blocks of characters;
        determining, using the sentiment dictionary, a respective sentiment value for each block of characters in the plurality of blocks of characters; and aggregating the respective sentiment value for each block of characters in the plurality of blocks of characters;
determine a total activation score for the electronic communication by:
  determining, using the sentiment dictionary, a respective activation value for each block of characters in the plurality of blocks of characters; and
  aggregating the respective activation value for each block of characters in the plurality of blocks of characters;
determine an overall sentiment for the electronic communication by combining the total sentiment score and the total activation score;
automatically construct training data usable for training the neural network based at least in part on the overall sentiment of the electronic communication, wherein the training data comprises a plurality of overall sentiments associated with a plurality of electronic communications usable for training the neural network;
train the neural network using the training data;
receive a second electronic communication comprising an unknown sentiment; and
determine at least one sentiment associated with the second electronic communication using the neural network.

2. The non-transitory computer readable medium of claim 1, further comprising program code executable by the processor for causing the processor to:
determine the overall sentiment for the electronic communication by:
  determining a plurality of total sentiment scores for the plurality of blocks of characters using the sentiment dictionary;
  determining an aggregate sentiment score for the electronic communication by aggregating the plurality of total sentiment scores; and
  determining the overall sentiment based on the aggregate sentiment score.

3. The non-transitory computer readable medium of claim 2, further comprising program code executable by the processor for causing the processor to:
determine the plurality of total sentiment scores for the plurality of blocks of characters using the sentiment dictionary by:
  accessing the sentiment dictionary;
  identifying one or more expressions in a respective block of characters that are in the sentiment dictionary;
  mapping the one or more expressions in the respective block to one or more corresponding sentiment values using the sentiment dictionary; and
  determining a respective total sentiment score for the respective block of characters by aggregating the one or more corresponding sentiment values.

4. The non-transitory computer readable medium of claim 3, further comprising program code executable by the processor for causing the processor to:
determine the respective total sentiment score for the respective block of characters by:
  determining a standard deviation associated with each sentiment value of the one or more corresponding sentiment values;
  determining weighted sentiment values by multiplying each sentiment value of the one or more corresponding sentiment values by a respective weighting factor based on an associated standard deviation value; and
  determining the respective total sentiment score for the respective block of characters by aggregating the weighted sentiment values.

5. The non-transitory computer readable medium of claim 2, further comprising program code executable by the processor for causing the processor to:
determine the aggregate sentiment score by:
  determining an average standard deviation associated with each block of the plurality of blocks of characters;
  determining weighted total sentiment scores by multiplying each total sentiment score by a respective weighting factor based on an associated average standard deviation; and
  aggregating the weighted total sentiment scores.

6. The non-transitory computer readable medium of claim 2, further comprising program code executable by the processor for causing the processor to:
segment the plurality of characters into the plurality of blocks of characters by dividing the plurality of characters such that each block in the plurality of blocks of characters comprises a single sentence including a common sentiment.

7. The non-transitory computer readable medium of claim 1, further comprising program code executable by the processor for causing the processor to:
receive the second electronic communication from a text message, an e-mail, a social media post, a tweet, a blog post, or a forum post.

8. The non-transitory computer readable medium of claim 1, further comprising program code executable by the processor for causing the processor to:
display a graphical user interface (GUI) visually indicating the at least one sentiment associated with the second electronic communication, the at least one sentiment comprising a positive sentiment, a neutral sentiment, or a negative sentiment.

9. The non-transitory computer readable medium of claim 8, wherein the GUI comprises a graph indicating at least one transition between two or more different sentiments associated with the second electronic communication.

10. The non-transitory computer readable medium of claim 8, further comprising program code executable by the processor for causing the processor to:
determine a provider of the at least one sentiment associated with the second electronic communication; and
indicate the provider within the GUI.

11. A method comprising:
receiving an electronic communication usable for training a neural network and comprising a plurality of characters;
receiving a sentiment dictionary comprising a plurality of expressions mapped to (i) a plurality of sentiment values representing different sentiments, (ii) a plurality of activation values representing different amounts of arousal, each expression of the plurality of expressions being mapped to a corresponding sentiment value of the plurality of sentiment values and a corresponding activation value of the plurality of activation values;
determining a total sentiment score for the electronic communication by:
  segmenting the plurality of characters into a plurality of blocks of characters;
  determining, using the sentiment dictionary, a respective sentiment value for each block of characters in the plurality of blocks of characters; and aggregating the respective sentiment value for each block of characters in the plurality of blocks of characters;
determining a total activation score for the electronic communication by:
   determining, using the sentiment dictionary, a respective activation value for each block of characters in the plurality of blocks of characters; and
   aggregating the respective activation value for each block of characters in the plurality of blocks of characters;
determining an overall sentiment for the electronic communication by combining the total sentiment score and the total activation score;
automatically constructing training data usable for training the neural network based at least in part on the overall sentiment of the electronic communication, wherein the training data comprises a plurality of overall sentiments associated with a plurality of electronic communications usable for training the neural network;
training the neural network using the training data;
receiving a second electronic communication comprising at least one unknown sentiment; and
determining at least one sentiment associated with the second electronic communication using the neural network.

12. The method of claim 11, further comprising:
determining the overall sentiment for the electronic communication by:
   determining a plurality of total sentiment scores for the plurality of blocks of characters using the sentiment dictionary;
   determining an aggregate sentiment score for the electronic communication by aggregating the plurality of total sentiment scores; and
   determining the overall sentiment based on the aggregate sentiment score.

13. The method of claim 12, further comprising:
determining the plurality of total sentiment scores for the plurality of blocks of characters using the sentiment dictionary by:
   accessing the sentiment dictionary;
   identifying one or more expressions in a respective block of characters that are in the sentiment dictionary;
   mapping the one or more expressions in the respective block to one or more corresponding sentiment values using the sentiment dictionary; and
   determining a respective total sentiment score for the respective block of characters by aggregating the one or more corresponding sentiment values.

14. The method of claim 13, further comprising:
determining the respective total sentiment score for the respective block of characters by:
   determining a standard deviation associated with each sentiment value of the one or more corresponding sentiment values;
   determining weighted sentiment values by multiplying each sentiment value of the one or more corresponding sentiment values by a respective weighting factor based on an associated standard deviation value; and
   determining the respective total sentiment score for the respective block of characters by aggregating the weighted sentiment values.

15. The method of claim 12, further comprising:
determining the aggregate sentiment score by:
   determining an average standard deviation associated with each block of the plurality of blocks of characters;
   determining weighted total sentiment scores by multiplying each total sentiment score by a respective weighting factor based on an associated average standard deviation; and
   aggregating the weighted total sentiment scores.

16. The method of claim 12, further comprising:
segmenting the plurality of characters into the plurality of blocks of characters by dividing the plurality of characters such that each block in the plurality of blocks of characters comprises a single sentence including a common sentiment.

17. The method of claim 11, further comprising:
receiving the second electronic communication from a text message, an e-mail, a social media post, a tweet, a blog post, or a forum post.

18. The method of claim 11, further comprising:
displaying a graphical user interface (GUI) visually indicating the at least one sentiment associated with the second electronic communication, the at least one sentiment comprising a positive sentiment, a neutral sentiment, or a negative sentiment.

19. The method of claim 18, wherein the GUI comprises a graph indicating at least one transition between two or more different sentiments associated with the second electronic communication.

20. The method of claim 18, further comprising:
determining a provider of the at least one sentiment associated with the second electronic communication; and
indicating the provider within the GUI.

21. A system comprising:
a processing device; and
a memory device in which instructions executable by the processing device are stored for causing the processing device to:
   receive an electronic communication usable for training a neural network and comprising a plurality of characters;
   receive a sentiment dictionary comprising a plurality of expressions mapped to (i) a plurality of sentiment values representing different sentiments, (ii) a plurality of activation values representing different amounts of arousal, each expression of the plurality of expressions being mapped to a corresponding sentiment value of the plurality of sentiment values and a corresponding activation value of the plurality of activation values;
   determine a total sentiment score for the electronic communication by:
      segmenting the plurality of characters into a plurality of blocks of characters:
      determining, using the sentiment dictionary, a respective sentiment value for each block of characters in the plurality of blocks of characters; and
      aggregating the respective sentiment value for each block of characters in the plurality of blocks of characters;
   determine a total activation score for the electronic communication by:
      determining, using the sentiment dictionary, a respective activation value for each block of characters in the plurality of blocks of characters; and aggregating the respective activation value for each block of characters in the plurality of blocks of characters;

determine an overall sentiment for the electronic communication by combining the total sentiment score and the total activation score;

automatically construct training data usable for training the neural network based at least in part on the overall sentiment of the electronic communication, wherein the training data comprises a plurality of overall sentiments associated with a plurality of electronic communications usable for training the neural network;

train the neural network using the training data;

receive a second electronic communication comprising at least one unknown sentiment; and determine at least one sentiment associated with the second electronic communication using the neural network.

22. The system of claim 21, wherein the memory device further comprises instructions executable by the processing device for causing the processing device to:

determine the overall sentiment for the electronic communication by:

determining a plurality of total sentiment scores for the plurality of blocks of characters using the sentiment dictionary;

determining an aggregate sentiment score for the electronic communication by aggregating the plurality of total sentiment scores; and determining the overall sentiment based on the aggregate sentiment score.

23. The system of claim 22, wherein the memory device further comprises instructions executable by the processing device for causing the processing device to:

determine the plurality of total sentiment scores for the plurality of blocks of characters using the sentiment dictionary by:

accessing the sentiment dictionary;

identifying one or more expressions in a respective block of characters that are in the sentiment dictionary;

mapping the one or more expressions in the respective block to one or more corresponding sentiment values using the sentiment dictionary; and determining a respective total sentiment score for the respective block of characters by aggregating the one or more corresponding sentiment values.

24. The system of claim 23, wherein the memory device further comprises instructions executable by the processing device for causing the processing device to:

determine the respective total sentiment score for the respective block of characters by:

determining a standard deviation associated with each sentiment value of the one or more corresponding sentiment values;

determining weighted sentiment values by multiplying each sentiment value of the one or more corresponding sentiment values by a respective weighting factor based on an associated standard deviation value; and determining the respective total sentiment score for the respective block of characters by aggregating the weighted sentiment values.

25. The system of claim 22, wherein the memory device further comprises instructions executable by the processing device for causing the processing device to:

determine aggregate sentiment score by:

determining an average standard deviation associated with each block of the plurality of blocks of characters;

determining weighted total sentiment scores by multiplying each total sentiment score by a respective weighting factor based on an associated average standard deviation; and aggregating the weighted total sentiment scores.

26. The system of claim 22, wherein the memory device further comprises instructions executable by the processing device for causing the processing device to:

segment the plurality of characters into the plurality of blocks of characters by dividing the plurality of characters such that each block in the plurality of blocks of characters comprises a single sentence including a common sentiment.

27. The system of claim 21, wherein the memory device further comprises instructions executable by the processing device for causing the processing device to:

receive the second electronic communication from a text message, an e-mail, a social media post, a tweet, a blog post, or a forum post.

28. The system of claim 21, wherein the memory device further comprises instructions executable by the processing device for causing the processing device to:

display a graphical user interface (GUI) visually indicating the at least one sentiment associated with the second electronic communication, the at least one sentiment comprising a positive sentiment, a neutral sentiment, or a negative sentiment.

29. The system of claim 28, wherein the GUI comprises a graph indicating at least one transition between two or more different sentiments associated with the second electronic communication.

30. The system of claim 28, wherein the memory device further comprises instructions executable by the processing device for causing the processing device to:

determine a provider of the at least one sentiment associated with the second electronic communication; and indicate the provider within the GUI.

* * * * *